United States Patent [19]

Shemtov

[11] Patent Number: 4,641,863

[45] Date of Patent: Feb. 10, 1987

[54] CONNECTOR FOR COUPLING A CONDUIT TO A JUNCTION BOX

[76] Inventor: Sami Shemtov, 18 Tryon Ave., Staten Island, N.Y. 10312

[21] Appl. No.: 797,043

[22] Filed: Nov. 12, 1985

[51] Int. Cl.⁴ .............................................. F16L 3/04
[52] U.S. Cl. .................................. 285/158; 285/205; 285/206; 285/209; 285/404; 403/409.1; 411/398
[58] Field of Search ................. 285/90, 158, 208, 209, 285/404, 205; 403/409.1, 362, 245; 411/398

[56] References Cited

U.S. PATENT DOCUMENTS

| | | | |
|---|---|---|---|
| 591,798 | 10/1897 | Strauss | 411/398 |
| 671,763 | 4/1901 | Greenfield | 285/404 |
| 944,725 | 12/1909 | Ferguson, Jr. | 411/398 |
| 1,902,229 | 3/1933 | Goetzelman | 285/208 |
| 2,111,243 | 3/1938 | Hecht | 285/404 |
| 2,241,293 | 5/1941 | Campbell | 285/208 |
| 2,973,212 | 2/1961 | Rose | 285/208 |
| 3,033,514 | 5/1962 | Grosch | 285/209 |
| 3,454,291 | 7/1969 | Goldsobel et al. | 285/404 |
| 3,728,470 | 4/1973 | Maier | 285/209 |
| 4,449,737 | 5/1984 | Specht | 285/209 |

Primary Examiner—Cornelius J. Husar
Assistant Examiner—Anthony Knight
Attorney, Agent, or Firm—Goodman & Teitelbaum

[57] ABSTRACT

A connector for coupling a conduit to a junction box. The connector includes a one piece elongated body portion having a distal end for receiving the conduit and a proximal end for connection in an aperture of the junction box. A pair of radially projecting flange members are spaced apart at the proximal end of the body portion for straddling the aperture edge wall of the junction box. An eccentric cam projecting from the tubular body portion is rotatable into an interference engagement with an outer surface of the apertured wall of the junction box to clamp the connector in place. The cam includes a screw having an offset head. One of the flange members includes a longer tab portion and an opposing smaller tab portion. The other flange member includes an annular rim.

11 Claims, 9 Drawing Figures

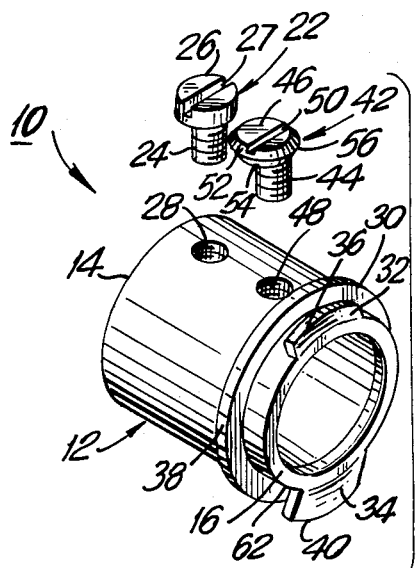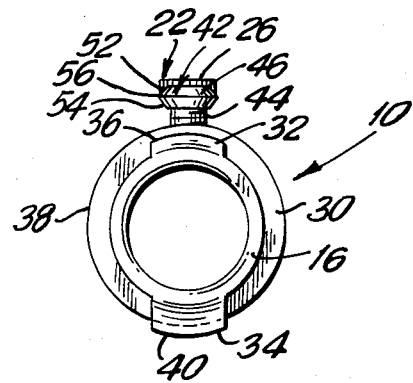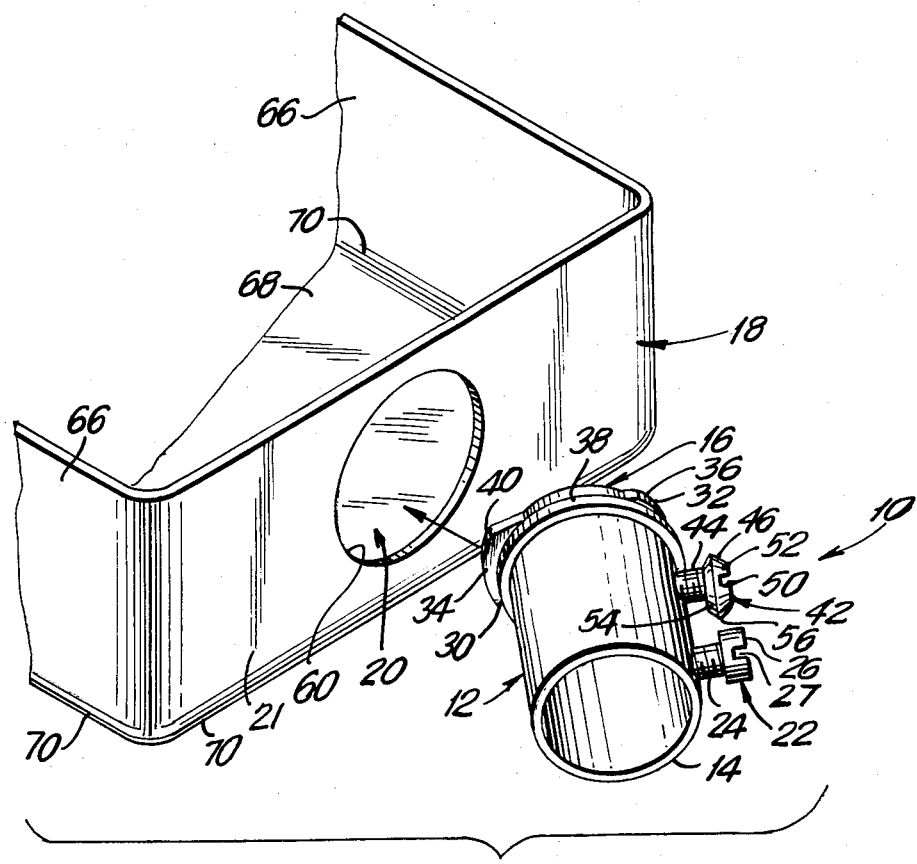

CONNECTOR FOR COUPLING A CONDUIT TO A JUNCTION BOX

BACKGROUND OF THE INVENTION

This invention relates to a connector for coupling a conduit to a junction box, and more particularly to a set screw connector typically used for coupling intermediate metallic tubing commonly referred to as EMT.

In electrical installations, junction boxes are commonly utilized for an electrical interconnection between separate wires. The wires are carried to the junction boxes by means of conduits or coax cables. Connectors or clamps are commonly utilized to interconnect the conduits to the junction boxes, as is well known in the art.

Each junction box has numerous apertures extending therethrough. Most connectors include a threaded nipple extending from a tubular body portion. The threaded nipple is inserted through one of the apertures in the junction box with the tubular body portion projecting outwardly from the aperture. A lock nut is threaded onto the nipple internally within the junction box so that the lock nut clamps against the inside wall of the junction box, thus securing the connector in place. It is noted, that either a shoulder of the tubular body portion or a second lock nut is engaged against the outside wall of the junction box. The conduit is inserted into the tubular body portion of the connector and secured by means of a set screw radially projecting into the tubular body portion.

Such above mentioned set screw connectors take up a fair amount of space inside the junction box because of the presence of the nipple and the lock nut therein. Especially, when multiple conduits are being fed into a common junction box, the presence of a plurality of such connectors takes up a very large amount of space within the common junction box, thus depriving adequate space therein for making the necessary electrical connections of the wires.

Additionally, since the lock nut is inserted from within the junction box, the electrician often encounters an awkward manipulation to attach the lock nut. Since the lock nut is a separate part of the connector, it may fall down, may get lost, or may cause electrical hazards by falling into electrically sensitive areas whereby it cannot be retrieved.

The lock nut also requires the use of a wrench or socket instrument which must be manipulated from within the junction box. This again provides a potential hazard, since such a tool inside the box may contact electrical wires while the connector is being secured in place.

Accordingly, there is need for an improved connector which can be connected to the junction box from outside the junction box, and which will reduce the amount of space required within the junction box to maintain it in place. Furthermore, a connector is needed that can be connected in a reduced amount of time and effort, and which avoids the possibility of losing parts during its connection in the junction box.

SUMMARY OF THE INVENTION

Accordingly, it is an object of the present invention to provide a set screw connector which avoids the aforementioned problems of prior art connectors.

Another object of the present invention is to provide a set screw connector which requires less space within the junction box than prior art connectors.

A further object of the present invention is to provide a set screw connector which can be connected to a junction box from the exterior of the junction box, and which requires only a single tool, specifically a screwdriver, for installation.

Yet a further object of the present invention is to provide a set screw connector which can be easily connected from the exterior of the junction box in a reduced amount of time.

Another object of the present invention is to provide a set screw connector which includes a one piece unit to permit easy connection thereof to a junction box from the exterior of the junction box.

Briefly, in accordance with the present invention, there is provided a set screw connector for coupling a conduit to a junction box. The connector includes an elongated tubular body portion which is installed so that it projects outwardly from an aperture in the junction box and is available to receive therein a conduit which is inserted into its distal end. A pair of radially projecting flange means are longitudinally spaced apart from the proximal end of the body portion. The first flange means is inserted into the aperture from the exterior of the junction box so that the pair of flange means straddle the peripheral wall of the aperture with the first flange means positioned on the interior of the wall and the second flange means positioned on the exterior of the wall. An eccentric cam is connected to the tubular body portion for rotation into an interference fit with the exterior wall of the junction box to clamp the connector in place, whereby the junction box wall adjacent the aperture is sandwiched between the first flange and the eccentric cam.

In an embodiment of the present invention, the eccentric cam is an offset head of a screw threadably inserted into the tubular body portion, the offset head being rotatable into engagement with the outer wall of the junction box at a point along the arcuate path of the offset head. The offset head is releasable from such engagement by an opposing rotation of the screw. The second flange means which is positioned on the outside of the junction box and is in the form of an annular rim. The first flange means on the inner side of the junction box includes both a radially projecting arcuately extending clamping tab and a diametrically opposed radially projecting arcuately extending anchoring tab.

The above and other objects, features and advantages of the present invention will, in part, be pointed out with particularity, and will, in part, become obvious from the following more detailed description of the present invention taken in conjunction with the accompanying drawings, which form an integral part thereof.

BRIEF DESCRIPTION OF THE DRAWING

In the drawings:

FIG. 1 is an exploded perspective view of a set screw connector in accordance with the present invention;

FIG. 2 is a front elevational view of the assembled connector;

FIG. 3 is an exploded fragmented perspective view showing a first step in the installation of the connector to a junction box;

In the various figures of the drawings, like reference characters designate like parts.

DESCRIPTION OF THE PREFEFFED EMBODIMENT

Figure 4:
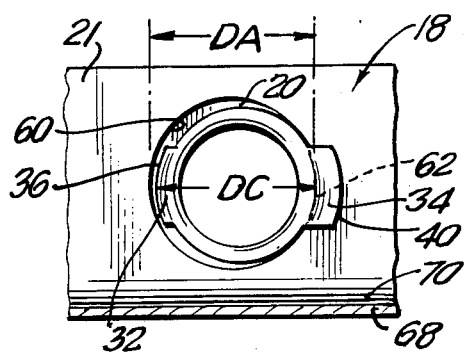
FIG. 4 is a front elevational view taken from inside the junction box, showing a subsequent step.

Referring now to the drawings, as shown in FIGS. 1 and 2, the present invention comprises a connector shown generally at 10 having a substantially tubular body portion 12 provided with a distal end 14 and a proximal end 16. Typically, the proximal end 16 is coupled to a junction box 18, shown in FIG. 3, by inserting it into the circular aperture 20 provided in the junction box wall 21, so that the connector 10 projects outwardly from the aperture 20.

A suitable conduit, such as intermediate metallic tube (EMT), can be inserted into the distal end 14 and secured in place. A set screw 22 having a threaded post 24 and a flat head 26 with a slot 27 is insertable into a correspondingly threaded aperture 28 in the tubular body portion 12 for locking the conduit in place, as set forth below.

At the proximal end 16, there is provided a pair of spaced apart first and second flange means for coupling to the junction box. The first flange means 30, spaced from the end, is in the form of an annular rim extending entirely around the periphery of the tubular body portion 12. The annular rim 30 has an outer diameter greater than the diameter of the aperture 20 in which the proximal end 16 is to be inserted. Spaced from the annular rim 30 and coplanar with the proximal end 16 of the tubular body portion 12, there are provided a pair of diametrically opposed tab portions 32, 34 defining the second flange means.

Tab portion 32 projects radially from the tubular body portion 12 and extends arcuately along a portion of the tubular body portion 12. The tab portion 34 likewise projects radially from the tubular body portion 12 and has an arcuate extension along the tubular body portion 12 substantially equal to that of the tab portion 32. As is noted from FIG. 2, the tab portion 32 has a peripheral edge 36 which is extended radially from the tubular body portion 12 less than the peripheral edge 38 of the annular rim 30. On the other hand, the tab portion 34 has a peripheral edge 40 which is extended radially from the tubular body portion 12 greater than the peripheral edge 38 of the annular rim 30, and therefore the peripheral edge 40 is extended radially greater than the peripheral edge 36 of tab portion 32. Accordingly, the tab portion 34 has a radial length greater than the annular rim 30, and the annular rim 30 has a radial length greater than the tab portion 32.

An eccentric cam 42 is provided in the form of a clamping screw having a threaded post 44 and an offset head 46. The cam 42 is insertable into a threaded aperture 48 in the tubular body portion 12. The aperture 48 is colinear with the aperture 28 and also with the tab portion 32.

The offset head 46 includes a transverse slot 50 which passes through the axis of the threaded post 44. The peripheral edge of the head 46 terminates in an upper and lower double bevel 52, 54 to define therebetween a knife edge 56. One side of the head 46 is offset and spaced further radially from the post axis than the opposing side of the head 46 to provide the offset enlarged portion of the head 46.

The installation of the connector 10 to the junction box 20 will now be described with respect to FIGS. 3-8. Initially the cam 42 is positioned in the tubular body portion 12 with the offset enlarged portion of the head 46 rotated away from the proximal end 16. The connector 10 is then angularly brought toward the junction box 18 with the larger tab portion 34 leading the way as shown in FIG. 3. The connector 10 is angularly inserted into the aperture 20 so that the aperture edge 60 of the junction box wall 21 is straddled between the larger tab portion 34 which is inside the junction box and the annular rim 30 which remains outside of the wall 21. The connector 10 is then shifted so that the aperture edge 60 of the junction box wall 21 abuts that part 62 of the tubular body portion 12 disposed between the larger tab portion 34 and the annular rim 30. The connector 10 is then swung to a perpendicular position with respect to the junction box 18, so that the smaller tab portion 32 passes through the aperture 20 to the position shown in FIG. 4.

As best shown in FIG. 4, the distance DC from that part 62 tubular body portion 12, disposed between the larger tab portion 34 and the annular rim 30, to the peripheral edge 36 of the small tab portion 32 is less than the diameter DA of the aperture 20. This permits the above mentioned swinging of the proximal end 16 of the connector 10 through the aperture 20.

Figure 5:
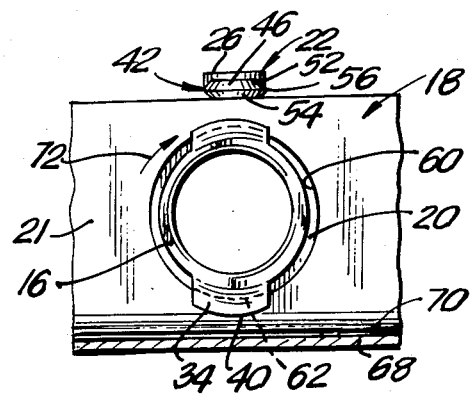
FIG. 5 is a front elevational view similar to that shown in FIG. 4, showing a further step.
Figure 6:
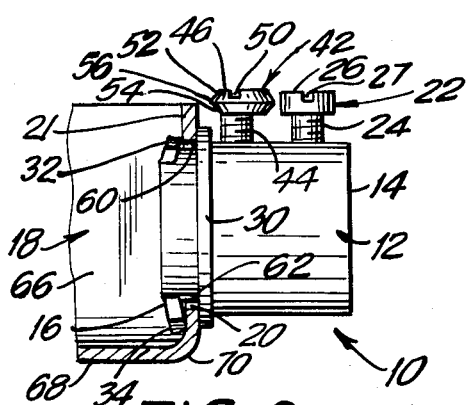
FIG. 6 is a side elevational view of FIG. 5.

As shown in FIGS. 5 and 6, by using the larger tab portion 34 as an anchor, the connector is then rotated and adjusted so that both the tab portions 32 and 34 are positioned against the inner peripheral edge wall around the aperture 20 in the junction box wall 21, where the smaller tab portion 32 now clamps the connector 10 to the junction box 18, as will be described more fully below.

Figure 7:
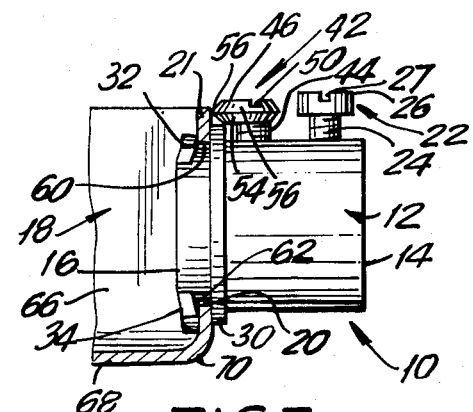
FIG. 7 is a side elevational view similar to that shown in FIG. 6, showing the eccentric cam rotated to lock the connector in place with respect to the junction box.

With the connector 10 now having both its tab portions 32, 34 against the wall 21, the eccentric cam 42 can be operated by inserting a screwdriver or similar tool into the slot 50 and rotating the offset head 46 so that the knife edge 52 is arcuately rotated into an interference fit with the outer surface of the wall 21 of the junction box 18, as shown in FIG. 7. The screw post 44 is of a height so that the offset head 46 can project and rotate above the peripheral edge 38 of the annular rim 30, and engage the wall 21 of the junction box 18. The wall 21 of the junction box is then securely clamped between the clamping tab portion 32 and the offset head 46. Thus, the connector 10 is secured in place to the junction box 18.

Figure 8:
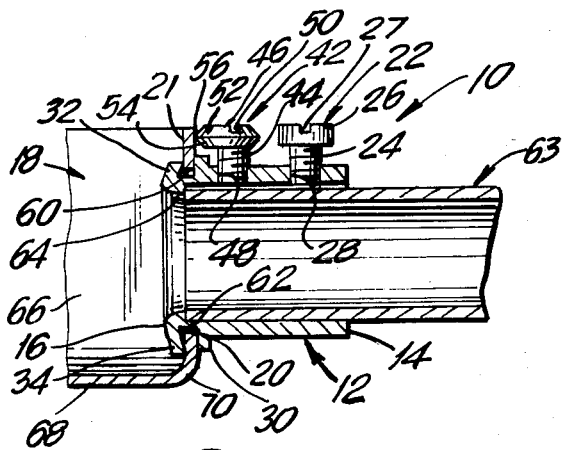
FIG. 8 is a cross sectional view taken through the connector of FIG. 7, showing a conduit coupled to the connector.

As shown in FIG. 8, a conduit 63 is then inserted into the distal end 14 of the tubular body portion 12, and locked in place by rotating the set screw 22 to clamp onto the outer peripheral wall of the conduit 63. An internal shoulder 64, in the form of a projecting rib, is provided internally of the proximal end 16 of the tubular body portion 12 as a stop to limit the insertion of the conduit 63. The shoulder 64 can have its abutting face surface coplanar with the engaging faces of the tab portions 32, 34 so that the inner end of the conduit 63 will correspond with the inner side of the junction box 18.

In order to provide for a greater engagement of the connector 10 to the junction box 18, the tab portions 32, 34 can have their peripheral edges arcuately bent toward the annular rim 30 so that they will bite into the inner surface of the junction box wall 21 to aid in the securement of the tab portions 32, 34 to the junction box wall 21 when the eccentric cam 42 is engaged against the outer surface of the junction box wall 21.

As can be seen in FIG. 3, the particular conventional junction box 18 includes the wall 21, peripheral rectangular side walls 66 and a base wall 68 which are interconnected at the bottom thereof by rounded fillets 70. As a result of the fillets 70, the present connector 10 provides a self-positioning arrangement. This can best be seen in FIGS. 4, 5 and 6. After the connector 10 is inserted into the aperture 20 as was described with respect to FIG. 4, by rotating the connector 10 as shown by the arrow 72 so that the anchoring tab portion 34 is downwardly directed, the peripheral edge 40 of the tab portion 34 will engage the upper portion of the fillet 70 and automatically move the connector 10 slightly upwardly so that the upper tab portion 32 abuts against the edge wall around the aperture 20. In this way, all that is needed to position both tab portions 32, 34 against the wall 21, is to rotate the connector 10 and a self-positioning type of action is achieved.

Figure 9:
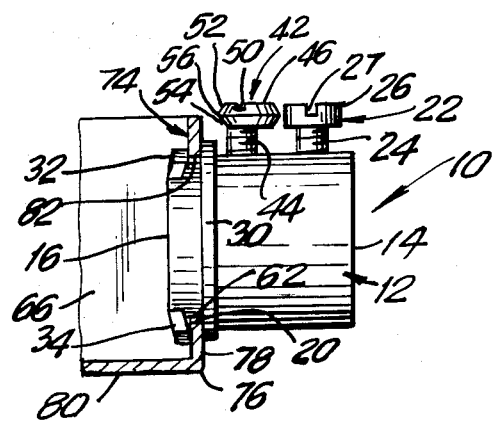
FIG. 9 is a side elevational view similar to that shown in FIG. 7, showing a modified junction box.

However, as shown in FIG. 9, the connector 10 can also be utilized in a type of junction box 74 which includes substantially right angles 76 between its forward wall 78 and its base wall 80. In this case, the anchoring tab portion 34 will not cause a self-positioning action by engaging any fillet, and instead a manual adjustment of the connector will be necessary to be sure that both the tab portion 34 as well as the tab portion 32 abut against the wall 78 of the junction box 74. It is noted, that with the junction box 74, the connector 10 need not be rotated for securement. Accordingly, the tab portion 34 of the connector 10 can be inserted at an angle through the aperture 82 with the screws 22, 42 and tab portion 32 positioned at the top. The connector 10 is then swung so that the tab portion 32 passes through the aperture 82. Then, the connector 10 is shifted so that both tab portions 32, 34 engage the wall 78. The cam 42 is then rotated to clamp the connector 10 and the junction box 74 together.

It will be noted, that with the connector 10 in place within the junction box 18 or 74, there is very little room taken up within the junction box. There is no threaded nipple or nut required on the inside of the junction box, which normally would require a considerable amount of space. The only amount of space within the junction box taken by the connector 10, is the minimal thickness of the tab portions 32, 34 which project inside of the junction box.

It is also noted, that the connector 10 is a one piece unit without the provision of a separate nut which might get lost. Only a single tool is required to install the connector 10, namely a screwdriver or the like. The connector 10 is also attached to the junction box by a very simple manipulation which requires a minimal amount of time.

To release the connector 10, all that is necessary is to rotate the offset head 46 in a direction counter to that made for it to engage the junction box wall. As soon as the head 46 is rotated away from the wall, as shown in FIG. 6, the clamping engagement of the connector 10 to the junction box wall is released, and the connector 10 can be removed in an opposite set of steps from which it was inserted, as set forth above. Specifically, the connector 10 will be moved to a position whereby the tab portion 32 no longer abuts the junction box wall, such as shown in FIG. 4, and by angularly manipulating the connector 10 and using the tab portion 32 as the leading edge, the connector 10 can be angularly removed from the junction box aperture and separated from the junction box, such as shown in FIG. 3.

There has been disclosed heretofore the best embodiment of the invention presently contemplated. However, it is to be understood that various changes and modifications may be made thereby without departing from the spirit of the present invention.

What is claimed is:

1. A connector for coupling a conduit to a junction box, said connector comprising:
   an elongated tubular body portion having a proximal end for insertion into a circular aperture in one wall of the junction box, and a distal end to receive the conduit;
   a pair of radially projecting first and second flange means longitudinally spaced apart at said proximal end of said body portion for straddling an edge wall of the circular aperture in the junction box;
   said second flange means being positioned inside the junction box and said first flange means being positioned outside the junction box;
   said first flange means including an annular rim having a peripheral diameter greater than a diameter of the circular aperture in the junction box so that said annular rim is prevented from passing through the circular aperture;
   said second flange means including first and second arcuately extending radially projecting tabs for engaging wall portions around the circular aperture in the junction box, said second tab being coplanar with and diametrically opposed to said first tab;
   an outer edge of said second tab extending radially further from an axis of said body portion than an outer edge of said annular rim;
   body end means for permitting said proximal end of said body portion to swing through the circular aperture after said second tab has been inserted through the circular aperture so that said first tab can pass through the circular aperture;
   said body end means including an outer edge of said first tab extending radially less from said axis of said body portion than said outer edge of said annular rim so that a radially projecting length of said first tab is shorter than a radially projecting length of said second tab, and a diameter of a circular part of said tubular portion disposed between said pair of first and second flange means being less than the diameter of the circular aperture in the junction box, and also a distance measured from said outer edge of said first tab to a section of said circular part of said tubular body portion disposed between said second tab and said annular rim being less than the diameter of the circular aperture in the junction box so that said first tab can pass through the circular aperture after said second tab has been inserted through the circular aperture; and
   eccentric cam means supported on said body portion for rotation into an interference engagement with an outer surface of the apertured one wall of the junction box to clamp said connector in place relative to the junction box;

said eccentric cam means including a post radially projecting from said body portion, said post supporting an offset head portion for rotation about an arcuate path into a clamping engagement with the outer surface of the junction box at a point along said arcuate path, said offset head portion being releasable from said clamping engagement by an opposing rotation;

said arcuate path of said offset head portion extending into the space between said pair of first and second flange means;

a double beveled periphery being provided about said offset head to define a peripheral knife edge for biting into the outer surface of the junction box.

2. A connector as in claim 1, wherein said post is externally threaded, and said body portion is provided with a threaded aperture for receiving said threaded post.

3. A connector as in claim 2, wherein said threaded post also defines a set screw for clamping the conduit in place within said tubular body portion.

4. A connector as in claim 1, and further comprising a set screw threadably inserted into said tubular body portion, and colinear with said post, for clamping the conduit within said tubular body portion.

5. A connector as in claim 1, and comprising an annular shoulder inwardly projecting into said tubular body portion for providing an insertion stop for the conduit.

6. A connector as in claim 5, wherein said shoulder is substantially coplanar with an edge of said proximal end of said body portion so that the conduit extends into the aperture of the junction box.

7. A connector as in claim 1, wherein said first tab is colinearly aligned with said eccentric cam means.

8. A connector as in claim 1, wherein the junction box includes a base wall interconnected to the apertured one wall by a fillet, and wherein a radial length of said second tab extends to reach the fillet so that rotation of said second tab against the fillet self-positions said first tab against said wall portion around the aperture in the junction box.

9. A connector as in claim 1, wherein arcuate lengths of said first tab and said second tab are substantially identical.

10. A connector as in claim 1, wherein outer edges of said first tab and said second tab are bent in a direction towards said annular rim to thereby bite into an inner surface of the apertured one wall of the junction box.

11. A connector as in claim 1, wherein said offset head portion includes a slot extending onto its upper surface, said slot being disposed along a longitudinal axis of said post.

* * * * *